US009485452B2

(12) United States Patent
Kato

(10) Patent No.: US 9,485,452 B2
(45) Date of Patent: Nov. 1, 2016

(54) IMAGING DEVICE, VIDEO CONTENT GENERATING METHOD AND STORAGE MEDIUM

(71) Applicant: CASIO COMPUTER CO., LTD., Shibuya-ku, Tokyo (JP)

(72) Inventor: Yoshiyuki Kato, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/221,235

(22) Filed: Mar. 20, 2014

(65) Prior Publication Data

US 2014/0286627 A1 Sep. 25, 2014

(30) Foreign Application Priority Data

Mar. 21, 2013 (JP) .................................. 2013-057705

(51) Int. Cl.
| | | |
|---|---|---|
| G11B 27/00 | (2006.01) |
| H04N 5/93 | (2006.01) |
| H04N 5/77 | (2006.01) |
| H04N 5/225 | (2006.01) |
| H04N 5/217 | (2011.01) |
| H04N 5/228 | (2006.01) |

(52) U.S. Cl.
CPC ..................................... *H04N 5/772* (2013.01)

(58) Field of Classification Search
USPC ........ 348/220.1, 241, 207.99, 208.4, 208.14; 386/278, 280, 282
See application file for complete search history.

(56) References Cited

U.S. PATENT DOCUMENTS

| | | | |
|---|---|---|---|
| 7,480,445 B2 | 1/2009 | Yamamoto et al. | |
| 8,634,657 B2 | 1/2014 | Sakamoto | |
| 8,644,687 B2* | 2/2014 | Kitagawa et al. ............ | 386/294 |
| 8,681,239 B2 | 3/2014 | Morioka et al. | |
| 8,942,546 B2* | 1/2015 | Kato .................... | G11B 27/034 386/326 |
| 2006/0034585 A1* | 2/2006 | Terada ............................ | 386/52 |
| 2006/0036948 A1* | 2/2006 | Matsuzaka .................... | 715/723 |

(Continued)

FOREIGN PATENT DOCUMENTS

| | | |
|---|---|---|
| JP | 2003-244614 A | 8/2003 |
| JP | 2003234937 A | 8/2003 |

(Continued)

OTHER PUBLICATIONS

Japanese Office Action dated Dec. 9, 2014 issued in counterpart Japanese Application No. 2013-057705.

(Continued)

*Primary Examiner* — Daquan Zhao
(74) *Attorney, Agent, or Firm* — Holtz, Holtz & Volek PC

(57) ABSTRACT

A CPU of an imaging device of the present invention causes an interval moving image to be captured for each interval photographing, selects frames to be stored as still images from among a plurality of frames constituting the interval moving image based on a face image, blurring, and the presence or absence of a change, and causes these selected still images to be stored in association with the interval moving image. When an amount of data exceeding that for a preset storage time length is recorded, the CPU first deletes low-grade interval moving images. Then, if this is not enough, the CPU deletes low-grade still images, and thereby retains an image file (a mixture of moving images and still images) within the desired time length.

12 Claims, 5 Drawing Sheets

(56) References Cited

U.S. PATENT DOCUMENTS

| | | | |
|---|---|---|---|
| 2006/0274157 A1* | 12/2006 | Levien et al. | 348/220.1 |
| 2007/0028287 A1* | 2/2007 | Yamamoto et al. | 725/135 |
| 2011/0026901 A1* | 2/2011 | Kashima | 386/282 |
| 2012/0019685 A1 | 1/2012 | Morioka et al. | |

FOREIGN PATENT DOCUMENTS

| | | |
|---|---|---|
| JP | 2006050494 A | 2/2006 |
| JP | 2006115289 A | 4/2006 |
| JP | 2006303657 A | 11/2006 |
| JP | 2011135209 A | 7/2011 |
| JP | 2012195949 A | 10/2012 |
| JP | 2012216918 A | 11/2012 |
| WO | 2010116715 A1 | 10/2010 |

OTHER PUBLICATIONS

Japanese Office Action (and English translation thereof) dated Jul. 7, 2015, issued in counterpart Japanese Application No. 2013-057705.

Korean Office Action (and English translation thereof) dated Jun. 12, 2015, issued in counterpart Korean Application No. 10-2014-0032556.

\* cited by examiner

IMAGING DEVICE, VIDEO CONTENT GENERATING METHOD AND STORAGE MEDIUM

CROSS-REFERENCE TO RELATED APPLICATION

This application is based upon and claims the benefit of priority from the prior Japanese Patent Application No. 2013-057705, filed Mar. 21, 2013, the entire contents of which are incorporated herein by reference.

BACKGROUND OF THE INVENTION

1. Field of the Invention

The present invention relates to an imaging device, a video content generating method, and a storage medium.

2. Description of the Related Art

Conventionally, there are imaging devices having an interval photographing function. With such an imaging device, still images are automatically captured at predetermined time intervals without the shutter button being pressed. As a result of this configuration, when checking recorded images after finishing image capturing, the photographer often finds still images not worth storing (for example, a still image showing a blurred landscape or subject or a still image showing a tilted landscape). When there is a still image not worth storing in a plurality of still images acquired by interval photographing, if this still image not worth storing is deleted, the temporal continuity of the images may be lost at the time of replay display.

Accordingly, a technology has been proposed by which the acquisition of still images not worth storing at the time of interval photographing is prevented to the extent possible. For example, Japanese Patent Application Laid-Open (Kokai) Publication No. 2003-244614 discloses a technology of generating a moving image file from a plurality of still images acquired by interval photographing, in which a still image set as a deletion target by a user operation is not included in the moving image file.

SUMMARY OF THE INVENTION

The present invention is to reduce inconveniences of selecting an image to be deleted and generate video content with a moderate change at the time of replay.

In accordance with one aspect of the present invention, there is provided an imaging device comprising: an obtaining section which obtains a predetermined number of images; a moving image generating section which generates a moving image based on the predetermined number of images obtained by the obtaining section; an evaluating section which evaluates each of the predetermined number of images obtained by the obtaining section based on predetermined evaluation details; a still image generating section which generates a still image based on a result of evaluation by the evaluating section; and a generating section which generates video content including a plurality of still images generated by the still image generating section and a plurality of moving images generated by the moving image generating section.

In accordance with another aspect of the present invention, there is provided a video content generating method comprising: an obtaining step of obtaining a predetermined number of images; a moving image generating step of generating a moving image based on the predetermined number of images obtained in the obtaining step; an evaluating step of evaluating each of the predetermined number of images obtained in the obtaining step based on predetermined evaluation details; a still image generating step of generating a still image based on a result of evaluation in the evaluating step; and a generating step of generating video content including a plurality of still images generated in the still image generating step and a plurality of moving images generated in the moving image generating step.

In accordance with another aspect of the present invention, there is provided a non-transitory computer-readable storage medium having stored thereon a program that is executable by a computer, the program being executable by the computer to perform functions comprising: obtainment processing for obtaining a predetermined number of images; moving image generation processing for generating a moving image based on the predetermined number of images obtained in the obtainment processing; evaluation processing for evaluating each of the predetermined number of images obtained in the obtainment processing based on predetermined evaluation details; still image generation processing for generating a still image based on a result of evaluation in the evaluation processing; and generation processing for generating video content including a plurality of still images generated in the still image generation processing and a plurality of moving images generated in the moving image generation processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

An embodiment of the present invention is described below with reference to the drawings.

A. Structure of Embodiment

Figure 1:
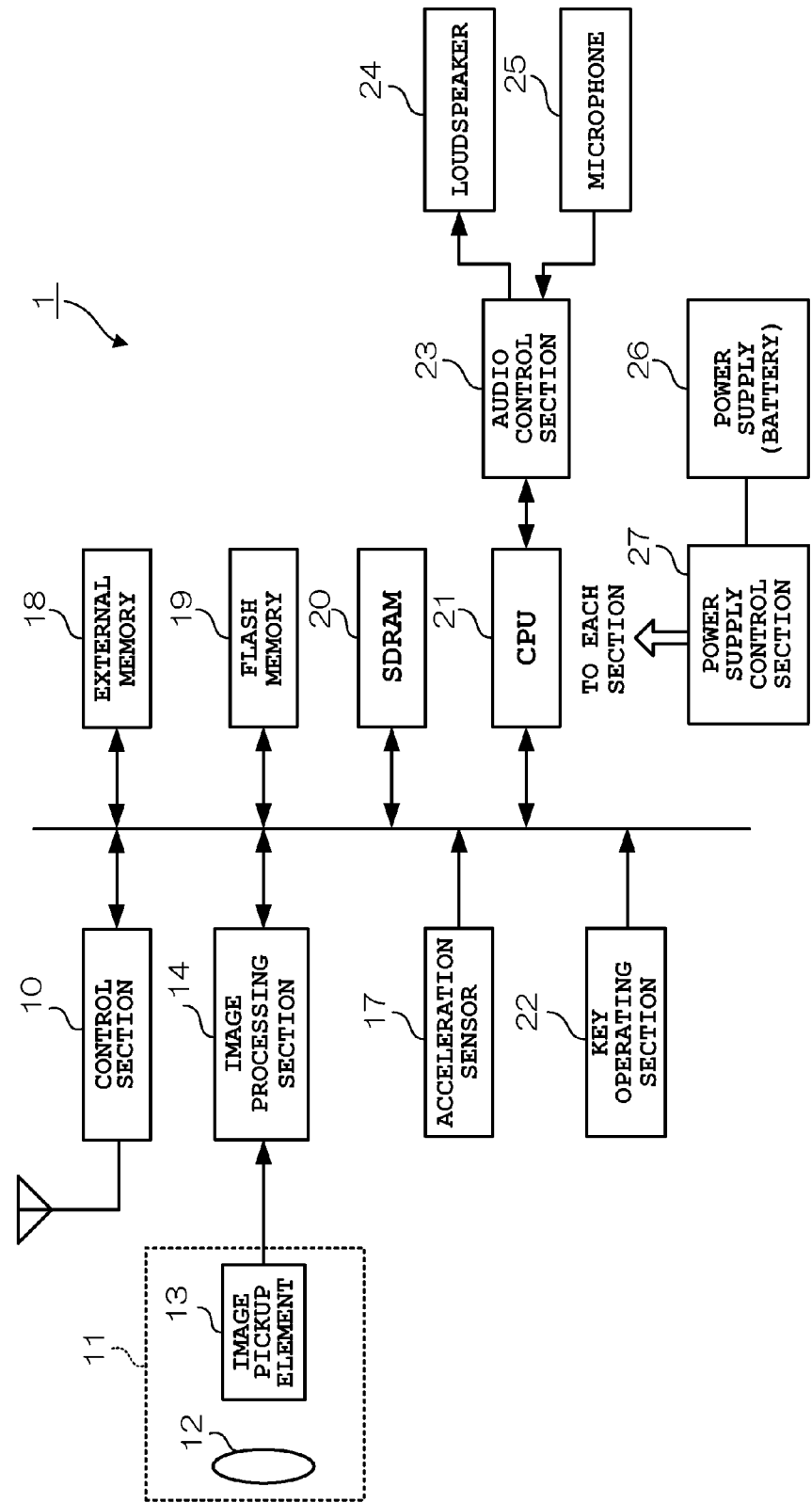
FIG. 1 is a block diagram showing the structure of an imaging device 1 according to an embodiment of the present invention.

FIG. 1 is a block diagram showing the structure of an aging device 1 according to an embodiment. In the drawing, the imaging device 1 includes a communication control section 10, an imaging section 11, an image processing section 14, an acceleration sensor 17, an external memory 18, a flash memory 19, an SDRAM (Synchronous Dynamic Random Access Memory) 20, a CPU (Central. Processing Unit) 21, a key operating section 22, an audio control section 23, a loudspeaker 24, a microphone 25, a power supply (battery) 26, and a power supply control section 27.

The communication control section 10 transfers image data obtained by image capturing to an information processing device, such as a server on the Internet or an individual personal computer, via the Internet. The imaging section 11 includes a lens block 12 constituted by an optical lens group, and an image pickup element 13 such as a CCD (Charge Coupled Device) or a CMOS (Complementary Metal Oxide Semiconductor). The image pickup element 13 converts images entering from the lens block 12 to digital signals. The image processing section 14 performs image processing (such as pixel interpolation processing, γ correction, luminosity color difference signal generation, white balance processing, exposure correction processing) on image data, and compression and extension of image data (such as compression and extension in Joint Photographic Experts Group (JPEG) format, Motion-JPEG [M-JPEG] format or Moving Picture Experts Group (MPEG) format).

The acceleration sensor 17 is constituted by, for example, a triaxial acceleration sensor and, in the present embodiment, detects a movement (shake) of the imaging device 1 at the time of interval photographing. The external memory 18 is a removable recording medium, and stores image data obtained by image capturing by the imaging section 11 and the like. The flash memory 19 is a recording medium which stores image data obtained by image capturing by the imaging section 11 and the like. The SDRAM 20 is used as a buffer memory which temporarily stores image data obtained by image capturing by the imaging section 11 and sent to the CPU 21, and also used as a working memory for the CPU 21.

The CPU 21 is a one-chip microcomputer for controlling each section of the imaging device 1, and performs capturing of still images, starting and stopping of moving image recording, and switching between still image capturing and moving image capturing.

In particular, in the present embodiment, the CPU 21 causes an interval moving image to be captured for each interval photographing, selects frames to be stored from among a plurality of frames constituting the interval moving image based on a face image, blurring, and the presence or absence of change, and causes these selected frames to be stored as still images in association with the interval moving image.

Also, when an amount of data exceeding that for a preset storage time length is recorded, the CPU 21 deletes low-grade interval moving images. Then, if the data amount still exceeds that for the preset storage time length, the CPU 21 deletes low-grade still images (frames), and thereby retains an image file (a mixture of moving images and still images) within the desired storage time length. As for the generated image file (a mixture of moving images and still images), the moving images are replayed as they are and the plurality of still images are replayed as a slide show in chronological capture order.

The key operating section 22 inputs an operation mode or an operation instruction for starting, pausing, or stopping image capturing in response to a touch operation from a user. The audio control section 23 converts audio (such as alarm sound) at the time of the playback of captured moving images to an analog signal and outputs it from the loudspeaker 24. Also, the audio control section 23 digitalizes and captures environmental sound collected by the microphone 25 in interval photographing. The power supply (battery) 26 is a rechargeable secondary battery. The power supply control section 27 stabilizes the output voltage of the power supply (battery) 26, and supplies driving electric power to each section.

B. Operation of Embodiment

Next, the operation of the present embodiment is described.

Figure 2:
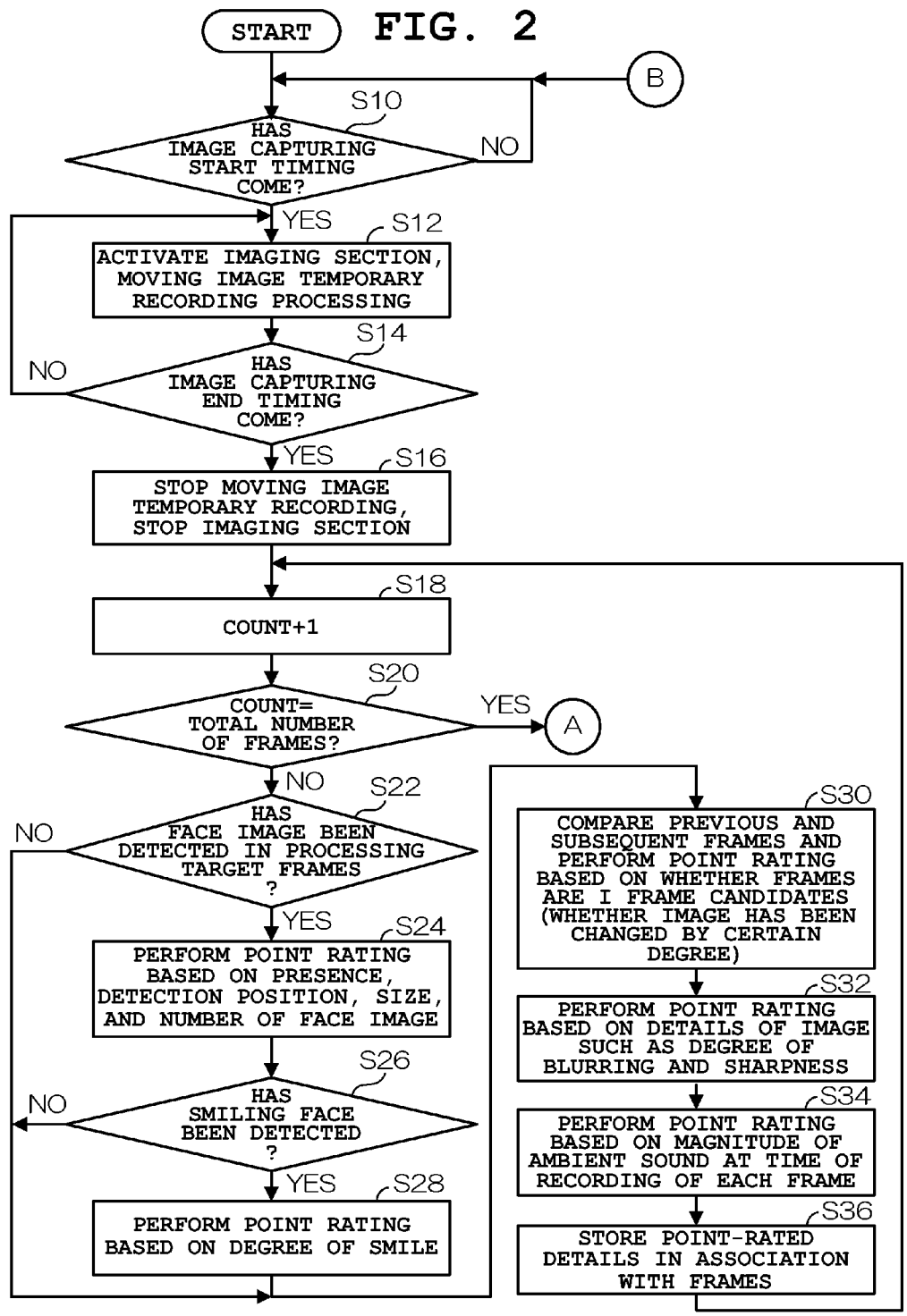
FIG. 2 is a flowchart for describing operation at the time of interval photographing by the imaging device 1 of the embodiment.

FIG. 2 is a flowchart for describing operation at the time of interval photographing by the imaging device 1 of the present embodiment. When the user operates the key operating section 22 of the imaging device 1 to set an interval mode, the CPU 21 of the imaging device 1 starts an interval timer and causes a flowchart depicted in FIG. 2 to be executed. Note that the interval timer is a timer for timing a time interval for interval photographing. In the interval mode, basically, the driving and the like of the image pickup element 13 is stopped for power saving until interval photographing.

The CPU 21 first judges whether predefined image capturing start timing for interval photographing has come (Step S10). Then, the CPU 21 repeats Step S10 and waits until the image capturing start timing comes (NO at Step S10). When judged that the image capturing start timing has come (YES at Step S10), the CPU 21 activates the image pickup element 13 to perform moving image temporary recording processing (Step S12). Next, the CPU 21 judges whether image capturing end timing has come (Step S14). When judged that the image capturing end timing has not come (that is, if a predetermined recording time has not elapsed) (NO at Step S14), the CPU 21 returns to Step S12 to continue the moving image temporary recording processing.

When judged that the image capturing end timing has come (YES at Step S14), the CPU 21 stops the moving image temporary recording and stops the image pickup element 13 (Step S16). At this point, an interval moving image recorded for the predetermined time length is stored. Next, the CPU 21 increments a count by 1 (Step S18) and judges whether the count has reached the total number of the frames (Step S20). Note that the total number of frames herein is the total number of frames in an interval moving image that can be captured by one moving image capturing. When judged that the count has not reached the total number of the frames (NO at Step S20), the CPU 21 judges whether a face image has been detected in the processing target frames of the interval moving image captured by the moving image temporary recording processing (Step S22).

When judged that a face image has been detected in the processing target frames (YES at Step S22), the CPU 21 performs point rating for each frame based on the presence of the face image, the detection point of the face image, the size of the face image, and the number of face images (Step S24). Next, the CPU 21 judges whether a smiling face has been detected (Step S26). When judged that a smiling face has been detected (YES at Step S26), the CPU 21 performs point rating for each frame based on the degree of the smile (Step S28).

At Step S22, when judged that a face image has not been detected in the processing target frames (NO at Step S22), the CPU 21 does not perform point rating based on face detection. When judged that a face image has been detected but it is not a smiling face (NO at Step S26), the CPU 21 performs face-image-based point rating but does not perform smiling-face-based point rating. In both cases, or in other words, regardless of whether point rating has been performed or has not been performed, the CPU 21 then compares previous and subsequent frames among the processing target frames, and performs point rating based on whether the frames are I frame candidates (that is, whether the image has been changed by a certain degree) (Step S30). Next, the CPU 21 performs point rating based on the details of the image, such as the degree of blurring and sharpness, from the processing target frames. (Step S32). Subsequently, the CPU 21 performs point rating based on the magnitude of ambient sound at the time of the recording of each frame (Step S34), and stores the point-rated details in association with the frames (Step S36). Then, the CPU 21 returns to Step S18 and repeats the above-described processing to perform point rating for each frame captured by one moving image capturing.

Figure 3:
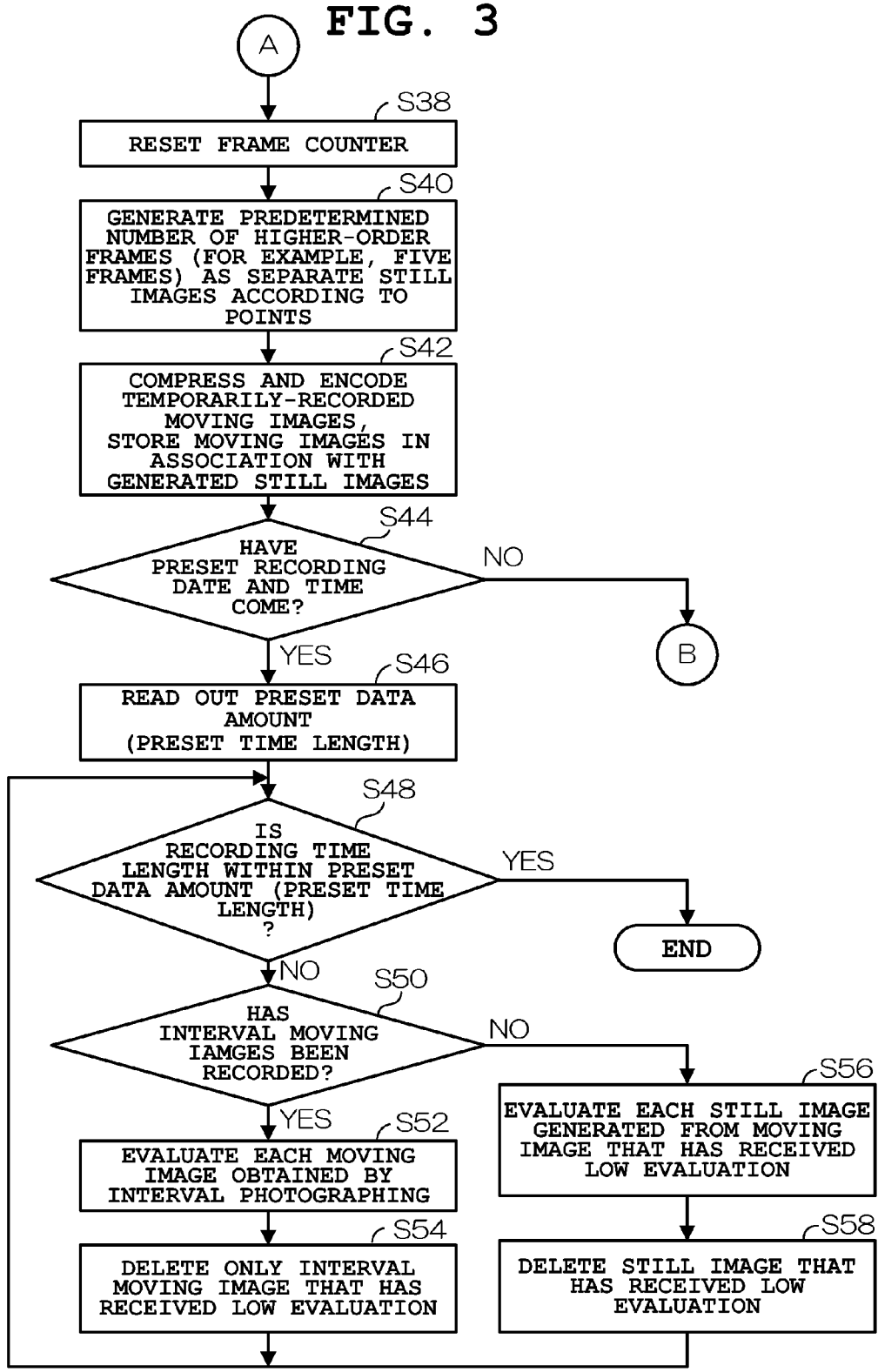
FIG. 3 is also a flowchart for describing the operation at the time of interval photographing by the imaging device 1 of the embodiment.

Then, when judged that the count has reached the total number of the frames, that is, when point rating for all the frames captured by one moving image capturing ends (YES at Step S20), the CPU 21 proceeds to a flowchart of FIG. 3, and resets a frame counter (=0) (Step S38). Next, the CPU 21 generates a predetermined number of higher-order frames (for example, five frames) as separate still images according to the points provided to each frame (Step S40), compresses and encodes the temporarily-recorded interval moving image, and stores the interval moving image in association with the generated still images (Step S42). Next, the CPU 21 judges whether preset recording date and time have come (Step S44). When judged that the preset recording date and time have not come (NO at Step S44), the CPU 21 returns to Step S10 of FIG. 2, and captures the next interval moving image by the processing described above.

As such, until the preset recording date and time come, moving images having the predetermined recording time length are acquired at predetermined time intervals. Every time moving image capturing ends, point rating is performed for each frame captured by one moving image capturing.

Then, when the preset recording date and time come (YES at Step S44), the CPU 21 reads out a preset data amount (or a preset time length) (Step S46), and judges whether the recording time length is within the preset data amount (within the preset time length) (Step S48). Then, when judged that the recording time length is not within the preset data amount (within the preset time length) (NO at Step S48), the CPU 21 judges whether interval moving images have been recorded (Step S50). When judged that interval moving images have been recorded (YES at Step S50), the CPU 21 evaluates each interval moving image obtained by the interval photographing (Step S52).

As with the frame evaluation, each interval moving image may be evaluated based on the degree of change or the viewability of each frame in an interval moving image, or evaluation details of each frame (points) maybe used. Next, the CPU 21 deletes only an interval moving image that has received a low evaluation (Step S54). That is, the CPU 21 retains relevant still images. Then, the CPU 21 returns to Step S48, and repeats the deletion of an interval moving image that has received a low evaluation. In the course of the deletion of interval moving images that have received low evaluations, when the recording time length comes within the preset data amount (preset time length) (YES at Step S48), the CPU 21 ends the processing.

On the other hand, if the recording time length does not come within the preset data amount (preset time length) even when the interval moving images that have received low evaluations are deleted (NO at Step S50), the CPU 21 evaluates (the points of) each still image generated from a moving image that has received a low evaluation (Step S56). Then, the CPU 21 deletes a still image that has received a low evaluation (Step S58). Here, if only one still image is left, a skip occurs at the time of replay and smooth replay cannot be achieved. Therefore, the last still image is not deleted. As such, when no interval moving image to be deleted is left, the CPU 21 deletes a still image. In the course of the deletion of still images that have received low evaluations, if the recording time length comes within the preset data amount (preset time length) (YES at Step S48), the CPU 21 ends the processing.

Figure 4:
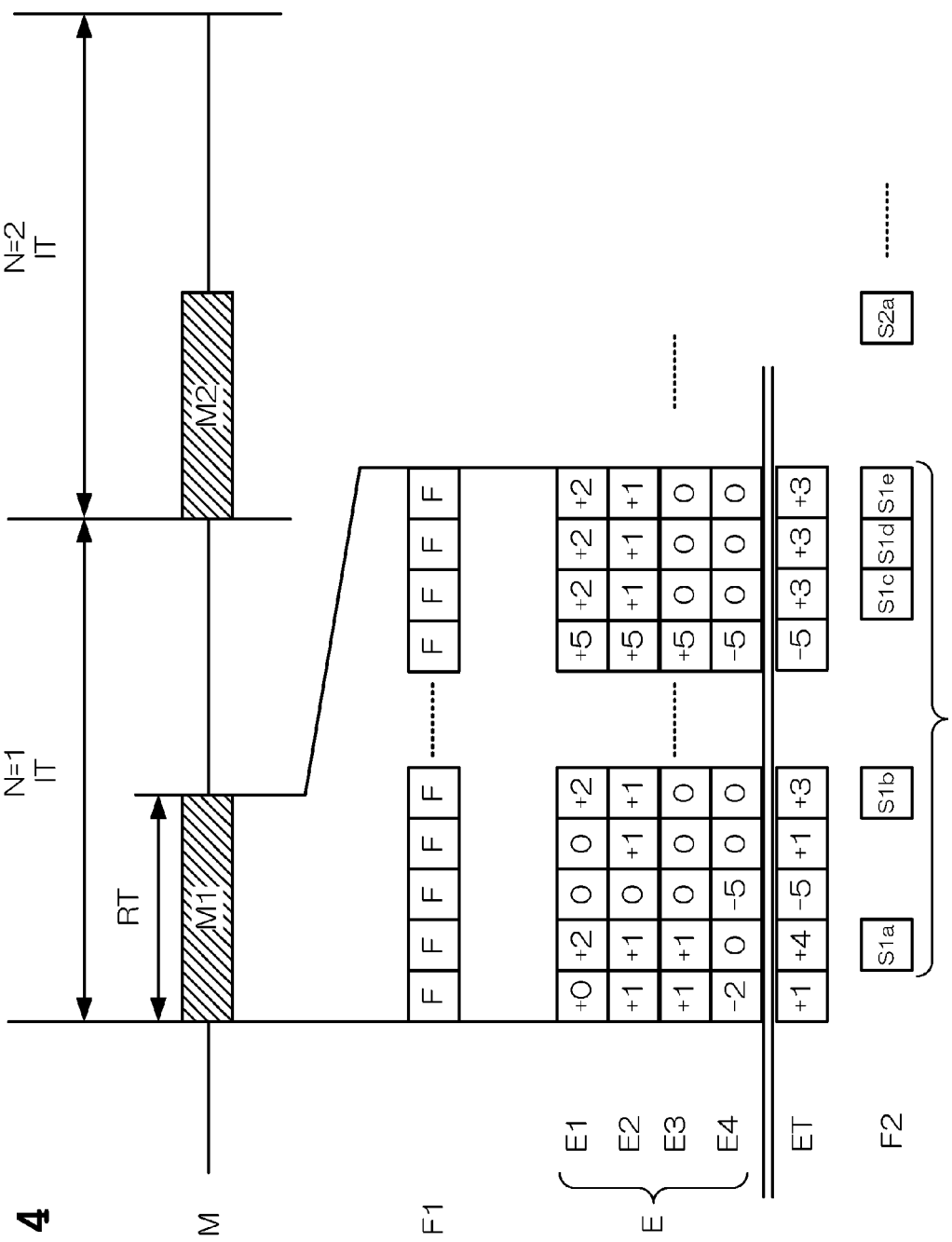
FIG. 4 is a timing chart for describing the operation at the time of interval photographing by the imaging device 1 of the embodiment.

FIG. 4 is a timing chart for describing the interval photographing operation (Steps S24 to S42) by the imaging device 1 of the present embodiment. In FIG. 4, the uppermost portion represents an interval photographing interval IT. Interval moving images M1, M2, and so on are captured for predetermined interval recording time lengths RT and stored as stored moving images M. The interval moving image M1 is constituted by a plurality of frames F1 (F, F, and so on) and each frame is evaluated and point-rated.

In the example depicted in the drawing, face detection E1, image change E2, sound change E3, and hard shake E4 are evaluated for each frame F. The image change E2 may represent not only the presence or absence of an I frame candidate but also contrast change, luminance change, color tone change or the like. The (ambient)) sound change E3 is change in sounds collected by the microphone 25 at the time of capturing interval moving images, including voice and exclamations uttered by the user without thought, words indicating the intention of image capturing, and environmental sounds occurring sporadically (such as a collision sound and an explosion sound) in the collected sounds. Since there is a high possibility of a good image capturing opportunity in events occurred along with these sounds, if these sounds are collected, the degree of evaluation is high. Also, the hard shake E4 represents the degree of shaking of the image processing device detected by the acceleration sensor 17. For example, the initial frame F of the interval moving image M1 is point-evaluated such that, as evaluation points, the face detection E1 is "+0", the image change E2 is "+1", the sound change E3 is "+1", the hard shake E4 is "-2", and a total evaluation ET is "+1". Similarly, the total evaluations of the frames F, F, F, and so on are respectively point-evaluated as "+4", "-5", "+1", "+3", . . . "-5", "+3", "+3", "+3". Then, top five frames that have received high evaluations are selected and stored. Point rating for each frame is performed for all captured interval moving images until interval photographing ends. As a result, when interval photographing ends, the plurality of interval moving images M1, M2, and so on and still images F2 each having five frames (F, F, F, F, F) selected from the relevant interval moving image are recorded.

Figure 5:
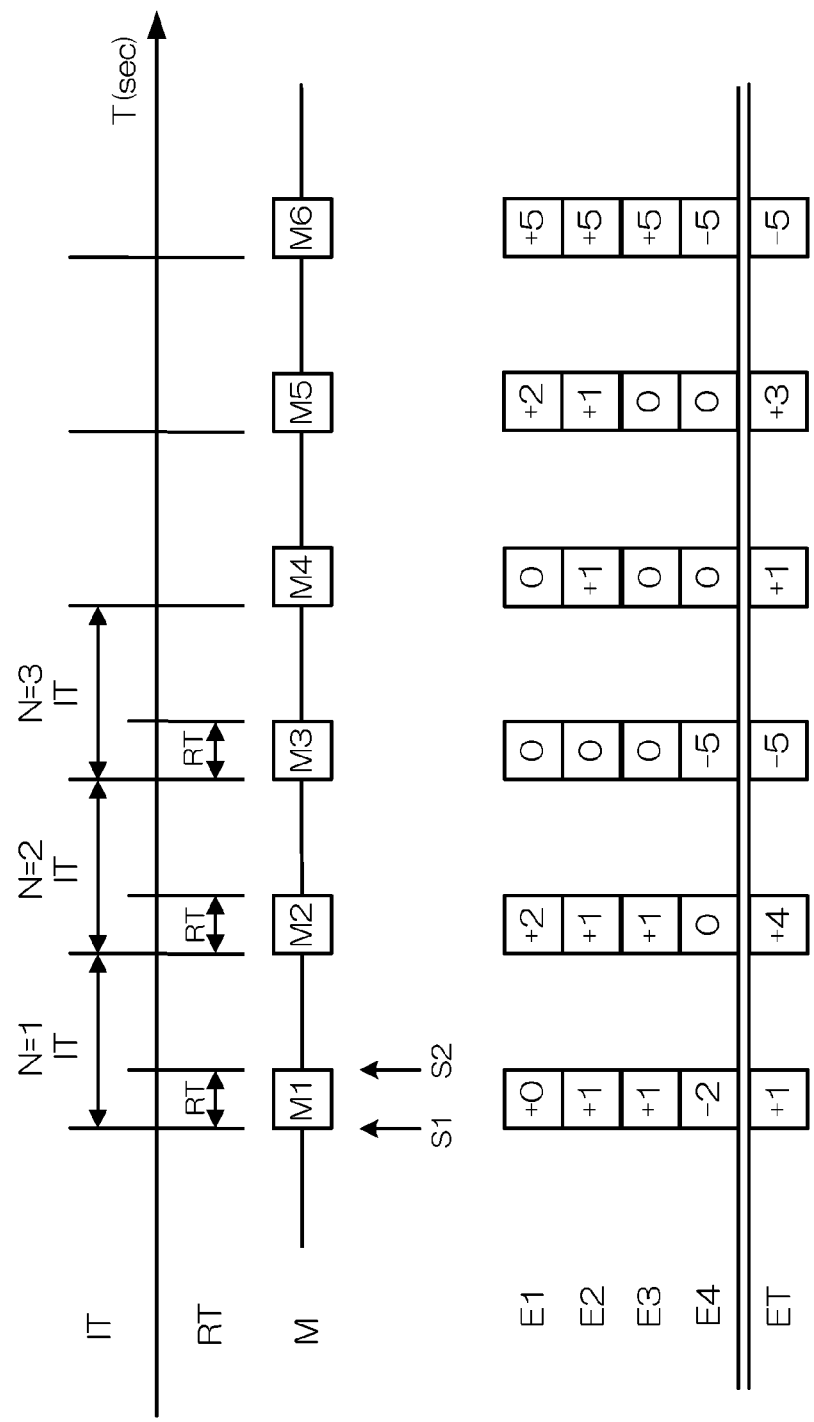
FIG. 5 is also a timing chart for describing the operation at the time of interval photographing by the imaging device 1 of the embodiment.

FIG. 5 is a timing chart for describing Steps S50 to S58 of FIG. 4. In FIG. 5, the uppermost portion represents the interval photographing interval IT. As the moving images M recorded for the predetermined interval recording time lengths RT, the interval moving images M1, M2, and so on are captured and stored. In the example of FIG. 5, as the evaluation of the interval moving images M1, M2 and so on, frames with highest total points are compared among frames (five frames) selected from each interval moving image, and an interval moving image that has received the lowest evaluation is deleted first. That is, in the example depicted in the drawing, the interval moving images are deleted in the order of M3, M6, M1, M4 and M5. Then, in the course of the deletion of the interval moving images that have received low evaluations, if the recording time length comes within the preset data amount (preset time length), the CPU 21 ends the processing at that moment.

As for the generated image file (a mixture of moving images and still images), the moving images are replayed as they are and the still images are replayed as a slide show in chronological capture order.

In the above-described embodiment, an interval moving image is captured for each interval photographing, frames to be stored as still images are selected from among a plurality of frames constituting the interval moving image based on a face image, blurring, and the presence or absence of a change, and the selected still images are stored in association with the interval moving image. When an amount of data exceeding that for a preset storage time length is recorded, low-grade interval moving images are first deleted. Then, if this is not enough, low-grade still images are deleted, whereby an image file (a mixture of moving images and still images) within the desired time length is retained. With this processing, it is possible to reduce inconveniences of selecting an image to be deleted and generate a moving image with a moderate change at the time of replay.

Also, in the above-described embodiment, editing is performed so that a final image file (a file that is a mixture of moving images and still images) within a preset data amount is created. As a result of this configuration, data can be within a time length desired by the user irrespective of a required processing time.

Moreover, in the above-described embodiment, a moving image is deleted based on an evaluation result. As a result of this configuration, unvaried moving images without any change can be omitted, and moving images with interest can be retained.

Furthermore, in the above-described embodiment, a still image is deleted based on an evaluation result. As a result of this configuration, unvaried still images without any change can be omitted, and still images with interest can be retained.

Still further, the predetermined evaluation details in the above-described embodiment include the presence or absence of a detected face image. As a result of this configuration, unvaried still images without any change can be omitted, and still images with interest can be retained.

Yet still further, the predetermined evaluation details in the above-described embodiment include the degree of smile in a face image. As a result of this configuration, unvaried still images without any change can be omitted, and still, images with interest can be retained.

Yet still further, the predetermined evaluation details in the above-described embodiment include the degree of change between a plurality of images. As a result of this configuration, unvaried still images without any change can be omitted, and still images with interest can be retained.

Yet still further, the predetermined evaluation details in the above-described embodiment include evaluation about details of a plurality of images. As a result of this configuration, unvaried still images without any change can be omitted, and still images with interest can be retained.

Yet still further, the predetermined evaluation details in the above-described embodiment include details about an ambient environment obtained at image capture timing. As a result of this configuration, unvaried still images without any change can be omitted, and still images with interest can be retained.

While the present invention has been described with reference to the preferred embodiments, it is intended that the invention be not limited by any of the details of the description therein but includes all the embodiments which fall within the scope of the appended claims.

What is claimed is:

1. A video content generating device comprising:
    an obtaining section which obtains a predetermined number of images;
    a moving image generating section which generates a moving image based on the predetermined number of images obtained by the obtaining section;
    an evaluating section which evaluates each of the predetermined number of images obtained by the obtaining section based on predetermined evaluation details;
    a still image generating section which generates a still image based on a result of the evaluation by the evaluating section; and
    a generating section which generates video content including a mixture of a plurality of still images generated by the still image generating section and a plurality of moving images generated by the moving image generating section,
    wherein, in the video content, (i) the plurality of still images are included with priority over the plurality of moving images, (ii) the plurality of still images are replayed in a slide-show style, (iii) the plurality of moving images are replayed as moving images and are replayed according to an obtainment order by the obtaining section, and (iv) the mixture of the plurality of still images and the plurality of moving images is replayed in a chronological capture order.

2. The video content generating device according to claim 1, further comprising an editing section which edits the video content such that the video content is within a preset data amount.

3. The video content generating device according to claim 2, wherein the editing section deletes one or more of the plurality of moving images based on the evaluation result by the evaluating section.

4. The video content generating device according to claim 2, wherein the editing section deletes one or more of the plurality of still images based on the evaluation result by the evaluating section.

5. The video content generating device according to claim 1, wherein the predetermined evaluation details include presence or absence of a detected face image.

6. The video content generating device according to claim 1, wherein the predetermined evaluation details include a degree of smile in a face image.

7. The video content generating device according to claim 1, wherein the predetermined evaluation details include a degree of change between a plurality of images.

8. The video content generating device according to claim 1, wherein the predetermined evaluation details include an evaluation about details of a plurality of images.

9. The video content generating device according to claim 1, wherein the predetermined evaluation details include details about an ambient environment obtained at an image capture timing.

10. The video content generating device according to claim 1, wherein the obtaining section obtains the predetermined number of images every time an image capture timing is detected.

11. A video content generating method comprising:
    obtaining a predetermined number of images;
    generating a moving image based on the obtained predetermined number of images;
    evaluating each of the obtained predetermined number of images based on predetermined evaluation details;
    generating a still image based on a result of the evaluation; and generating video content including a mixture of a plurality of the generated still images and a plurality of the generated moving images, wherein, in the video content, (i) the plurality of still images are included with priority over the plurality of moving images, (ii) the plurality of still images are replayed in a slide-show style, (iii) the plurality of moving images are replayed as moving images and are replayed according to an obtainment order in the obtaining of the images, and (iv) the mixture of the plurality of still images and the plurality of moving images is replayed in a chronological capture order.

12. A non-transitory computer-readable storage medium having stored thereon a program that is executable by a computer, the program being executable by the computer to perform functions comprising:

obtaining a predetermined number of images;

generating a moving image based on the obtained predetermined number of images;

evaluating each of the obtained predetermined number of images based on predetermined evaluation details;

generating a still image based on a result of the evaluation; and generating video content including a mixture of a plurality of the generated still images and a plurality of the generated moving images, wherein, in the video content, (i) the plurality of still images are included with priority over the plurality of moving images, (ii) the plurality of still images are replayed in a slide-show style, (iii) the plurality of moving images are replayed as moving images and are replayed according to an obtainment order in the obtaining of the images, and (iv) the mixture of the plurality of still images and the plurality of moving images is replayed in a chronological capture order.

* * * * *